May 1, 1928. 1,667,983
F. PORSCHE
LUBRICATING DEVICE FOR INTERNAL COMBUSTION ENGINES
Filed Jan. 14, 1925
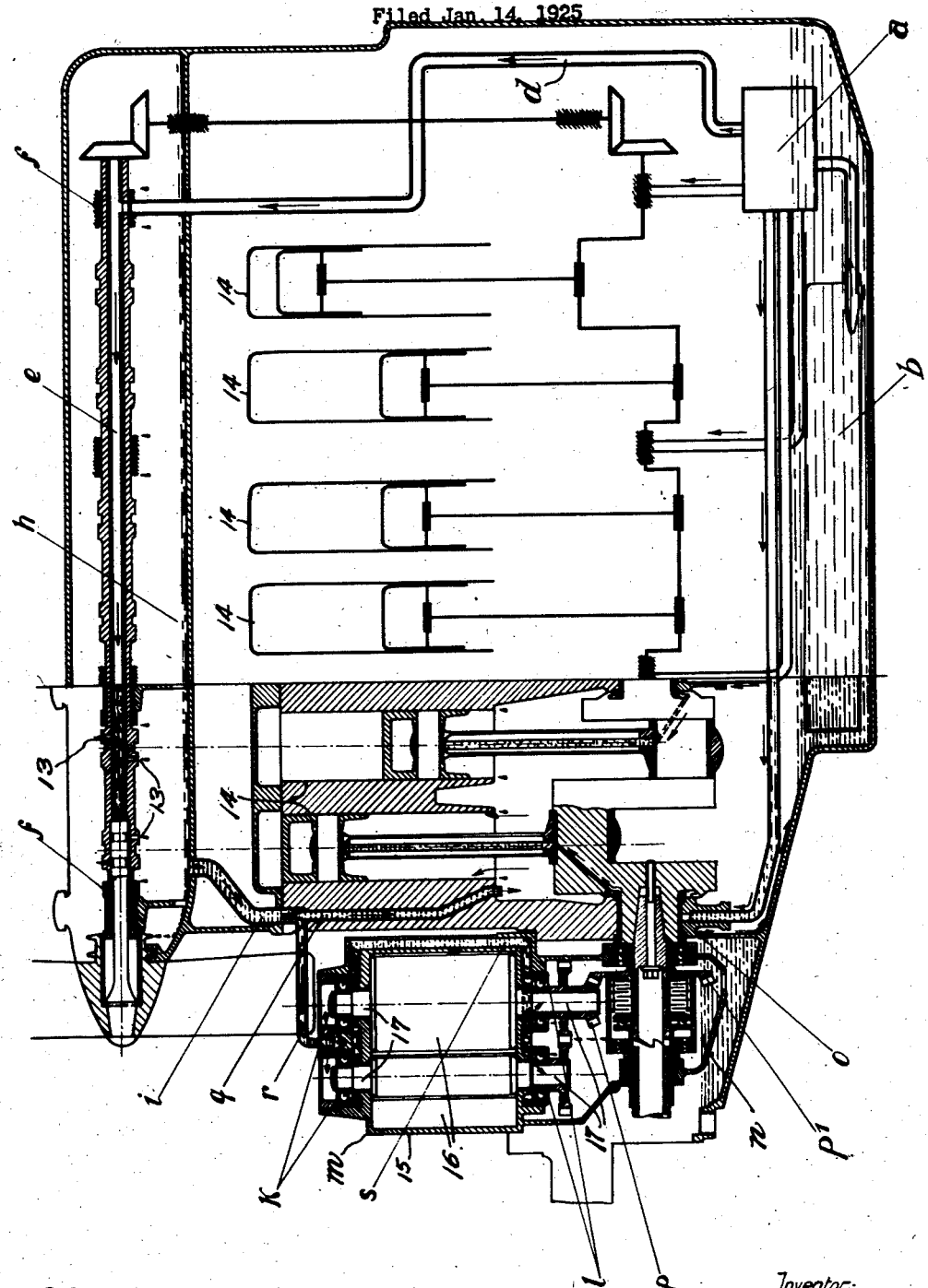
Witnesses:
W. G. Izeren.
Inventor:
Ferdinand Porsche.
by W. Pataky
his Attorney Patented May 1, 1928.

1,667,983

UNITED STATES PATENT OFFICE.

FERDINAND PORSCHE, OF STUTTGART-UNTERTURKHEIM, GERMANY, ASSIGNOR, BY MESNE ASSIGNMENTS, TO DAIMLER-BENZ AKTIENGESELLSCHAFT, OF BERLIN, GERMANY.

LUBRICATING DEVICE FOR INTERNAL-COMBUSTION ENGINES.

Application filed January 14, 1925, Serial No. 2,454, and in Germany August 20, 1924.

This invention relates to an apparatus for lubricating the bearings of a blower used in connection with internal combustion engines in which the charge of fuel is injected into the cylinder of the engine under pressure.

Blowers of this character commonly known as "Root" rotary blowers are employed to provide a temporary charge of fuel under pressure to the working cylinders of an engine. By means of the operation of the blower, air is forced into the carburetor, where the air mixes with the raw fuel and thereafter enters the engine cylinders. Root rotary blowers comprise a blower casing within which a pair of wings are disposed, the said wings being preferably supported on ball bearings or any other type of bearing suitable for the purpose. Bearings of this character require liberal lubrication and it has been the practice to provide the bearings with grease carrying boxes or cups at suitable places in the bearing. Such grease receptacles require attention, that is to say, they must be refilled from time to time. If from neglect the bearings are allowed to run dry, serious damage to the moving parts may be the result and as a consequence, interruption of the plant.

With the foregoing in mind it is the purpose of the present invention to couple a lubricating system for a blower with the circulating lubricant flowing to the bearings and other moving parts of an internal combustion engine, thereby entirely eliminating the necessity for grease cups and the like and consequent attention thereto. I accomplish this purpose by means of the apparatus illustratively exemplified in the accompanying drawings, in which the figure represents a substantially longitudinal sectional view of an internal combustion engine equipped with Root's blower and oiling system.

Referring to the drawings, $a$ denotes an oil pump disposed in the lower part of the engine crank case 10 and arranged to pump oil from an oil collector $b$ disposed in a wall in the crank case 10. The pump operates to lift the oil through a stand pipe $d$ to a bore $e$ in an overhead cam shaft 11 receiving its rotary movement through a gear connection with the main crank shaft 12 of the engine. The cam shaft 11 rotates in suitable bearings which are lubricated by means of the oil being distributed through radial openings 13 in communication with the bearing surfaces of both the shaft and bearings. Additional distributing openings in the hollow cam shaft enable the oil not otherwise consumed in the bearings $f$ to escape and collect in a casing $h$ disposed between the cam shaft and head of the engine cylinders 14. It follows that oil in the casing $h$ will effect lubrication of the rotating crank pins of the oscillating levers and of the valve stems (not shown). The oil collected in the casing $h$ is led off at one end thereof through a pipe $i$ which communicates with a pipe $q$ having direct communication with the interior of the crank casing $b$ and a branch pipe $r$ which directs the oil to the upper bearings $k$ of the blower $m$. The blower comprises a casing 15 in which are mounted two upright rotary wings or wheels 16, the opposite ends of the wheels being provided with stud shafts 17 arranged in the upper bearings $k$ and lower bearings $l$. The oil not consumed in the upper bearings $k$ is collected beneath the latter in a recess in the casing 15 and conducted off through a passage $s$ in the walls of the casing. The lower end of the passage $s$ leads to the lower bearings $l$ and from the latter the oil drips upon a pair of spur gears 18 carried by the lower stud shafts 17 of the wheels 16. Beneath the gears 18 and in advance of the crank casing $b$ the oil collects in a reservoir $n$ which carries the oil at sufficient depth to immerse the lower portion of a bevel gear $p'$ carried by the main crank shaft 12 and imparting rotary movement to a second bevel gear $p$ disposed on one of the lower stud shafts 17 of the blower. The necessary height of oil is maintained in the reservoir $n$ by a wall $o$ projecting upright from the crank case $b$ adjacent the forward end thereof. The final movement of the oil from the reservoir is to flow over the wall $o$ and thence back to the wall of the crank case $b$ over a slightly inclined portion of the casing leading from the forward end of the engine to the oil wall in which the oil collector is disposed.

In connection with the lubrication of the main crank shaft 12 of the engine and its bearings, it will suffice to say that separate lines from the pump *a* distribute the oil in any of the well known methods employed for the purpose.

I claim:

1. In an internal combustion engine the combination of a blower charging said engine under pressure, an oil container, a pipe system means to force oil from said container through said pipe system, means connected with said pipe system for lubricating parts of said blower and an intermediate container arranged between said blower and said first container and connected to said first container by overflow in order to retain the oil in said intermediate container at level sufficient to lubricate parts of said blower by immersion.

2. In an internal combustion engine the combination of a blower for charging the engine under pressure, an oil container, a pipe system, means to circulate oil from said container through said system, means to connect said pipe system with parts of said engine to lubricate said parts and means to connect said pipe system with parts of said blower to lubricate said parts, said blower having a container to lubricate some of its parts by immersion and an intermediate container arranged between said blower and said oil container and connected with said pipe system.

3. In an internal combustion engine the combination of a blower adapted to charge said engine under pressure an oil container, a pipe system, means to force oil from said container, through said system, connecting means between said pipe system and said engine to lubricate parts thereof a casing formed round the cam shaft of said engine and adapted to act as a collector for oil draining from said lubricated parts, a pipe conveying oil from said casing to said blower and means to convey oil from said blower to said container.

4. In an internal combustion engine the combination of a blower adapted to charge said engine under pressure, an oil container, a pipe system, means to force oil from said container through said system, connecting means between said pipe system and said engine to lubricate parts thereof a casing formed round the cam shaft of said engine and adapted to act as collector for oil draining from said lubricated parts, a pipe conveying oil from said casing to said blower and an intermediate container between said blower and said container and overflow means in said intermediate container to allow oil to return to said first container after reaching a predetermined level.

5. In an internal combustion engine having a crank shaft and a cam shaft the combination of a Root's blower adapted to charge said engine under pressure, a geared connection between the crank shaft of said engine and said blower, an oil container, a pipe system, means to force oil from said container through said pipe system connecting means between said pipe system and said engine to lubricate parts thereof, a casing formed round the cam shaft of said engine and adapted to act as collector for oil draining from said lubricated parts, a pipe conveying oil from said casing to said blower, an intermediate container formed around said gears, and overflow means in said container connecting the latter with said first container arranged at a height to allow oil to accumulate to lubricate said gears.

6. In an internal combustion engine the combination of a blower adapted to charge said engine under pressure an oil container, a pipe system, means to force oil from said container through said system, connecting means between said pipe system and said engine to lubricate parts thereof a casing formed round the cam shaft of said engine and adapted to act as collector for oil draining from said lubricated parts, a pipe conveying oil from said casing to said blower and an intermediate container between said blower and said container and overflow means in said intermediate container to allow oil to return to said first container after reaching a predetermined level, a tube protecting in to the pipe connecting the casing formed round the cam shaft with the blower said tube for reconducting the excess of the lubricant directly in to the container.

7. In an internal combustion engine the combination of a blower for charging the engine under pressure, an oil reservoir, a continuous oil circulation system for said engine including said reservoir, positioned in operative relation to the engine parts to be lubricated, a pump in said system and a branch circulation system including the parts of said blower which are to be lubricated, connected in parallel with said engine circulation system.

In testimony whereof I affix my signature.

FERDINAND PORSCHE.